(12) United States Patent
Cruz et al.

(10) Patent No.: US 11,803,778 B2
(45) Date of Patent: *Oct. 31, 2023

(54) ACTIONABLE ALERTING AND DIAGNOSTIC SYSTEM FOR WATER METERING SYSTEMS

(71) Applicant: WATSCO VENTURES LLC, Coconut Grove, FL (US)

(72) Inventors: Mario A. Cruz, Coconut Grove, FL (US); James McKeown, Coconut Grove, FL (US); Yigal Akselman, Coconut Grove, FL (US); Daniel Urquhart, Kitchener (CA)

(73) Assignee: Watsco Ventures LLC, Coconut Grove, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,613

(22) Filed: Jun. 6, 2022

(65) Prior Publication Data

US 2023/0039969 A1 Feb. 9, 2023

Related U.S. Application Data

(63) Continuation-in-part of application No. 17/393,617, filed on Aug. 4, 2021, now Pat. No. 11,353,840.

(51) Int. Cl.
*G06N 20/10* (2019.01)
*G06Q 50/06* (2012.01)

(52) U.S. Cl.
CPC ............ *G06N 20/10* (2019.01); *G06Q 50/06* (2013.01)

(58) Field of Classification Search
CPC ............................. G06N 20/10; G06Q 50/06

USPC .............................. 700/276; 702/51; 340/540
See application file for complete search history.

(56) References Cited

U.S. PATENT DOCUMENTS

| 6,073,089 A | 6/2000 | Baker et al. |
| 7,239,979 B1 * | 7/2007 | McComber ............ G06F 11/327 |
| | | 714/45 |
| 10,876,753 B2 | 12/2020 | Cruz et al. |
| 11,398,990 B1 * | 7/2022 | Cabrera ................ H04L 47/822 |

(Continued)

FOREIGN PATENT DOCUMENTS

| CN | 111339309 A | * | 6/2020 |
| CN | 112097365 A | | 12/2020 |

(Continued)

OTHER PUBLICATIONS

Canadian Examiner Report for Canadian Application No. 3,169,020, dated Dec. 23, 2022.

(Continued)

*Primary Examiner* — Thomas C Lee
*Assistant Examiner* — Michael Tang
(74) *Attorney, Agent, or Firm* — DLA PIPER LLP (US)

(57) ABSTRACT

A computer-implemented method for providing explainable diagnostics fora water metering system. The method can include receiving data from a water metering system regarding a potential issue in the water metering system; curating the data with a machine learning model; receiving ground truth data associated with the curated data from a user of the water metering system; comparing the curated data with the ground truth data; and optimizing the machine learning model based on the comparing.

18 Claims, 8 Drawing Sheets

(56) References Cited

U.S. PATENT DOCUMENTS

| | | |
|---|---|---|
| 2008/0167877 A1 | 7/2008 | McAllister et al. |
| 2009/0203971 A1 | 8/2009 | Sciarappa et al. |
| 2014/0025613 A1* | 1/2014 | Ponulak ................. G06N 3/049 |
| | | 706/25 |
| 2015/0149100 A1* | 5/2015 | Eisenbeis ................ F16K 31/04 |
| | | 702/58 |
| 2015/0333998 A1 | 11/2015 | Gopalakrishnan et al. |
| 2018/0373234 A1* | 12/2018 | Khalate .................. G06N 7/005 |
| 2019/0303569 A1* | 10/2019 | Cheng ................. G06F 16/2465 |
| 2020/0225118 A1 | 7/2020 | Billing et al. |
| 2020/0240662 A1 | 7/2020 | Picardi et al. |
| 2020/0356900 A1* | 11/2020 | Briancon ................ G06N 5/022 |
| 2020/0357513 A1 | 11/2020 | Katra et al. |
| 2020/0398083 A1* | 12/2020 | Adelsheim ........... A61N 5/1075 |
| 2020/0401593 A1 | 12/2020 | Panuganty et al. |
| 2021/0071889 A1 | 3/2021 | Picardi et al. |
| 2021/0084058 A1 | 3/2021 | Soliman |
| 2021/0133670 A1 | 5/2021 | Cella et al. |
| 2021/0354723 A1* | 11/2021 | McCool ................ G06V 20/588 |
| 2021/0388950 A1* | 12/2021 | Solomon ................... F17D 5/06 |

FOREIGN PATENT DOCUMENTS

| | | | |
|---|---|---|---|
| CN | 112562690 A | * | 3/2021 |
| JP | 2020185974 A | | 11/2020 |

OTHER PUBLICATIONS

Notice of Allowance issues in Mexican Application No. MX/a/2022/009506 dated Jul. 5, 2023.

* cited by examiner

FIG. 4 hw-ec-variation:

Do you agree? 510
● Yes
○ No
○ I'm unsure/not enough info to decide.
○ This could be either a hardware or install issue.
○ This could be either a hardware or wms issue.
○ This could be either an install or wms issue.
○ I suspect this is actually an WMS problem.
○ I am sure this is an WMS problem.
○ I suspect this is actually an installation problem.
○ I am sure this is an installation problem.

Note: 520

[Submit] 530

| Cases | caseName | Reviewed | ReviewedTogether | recommendedAlert | systemId |
|---|---|---|---|---|---|
| | amused_heron | true | yes | yes | 5b2bcbc9-e705-4544-89f6-387a7... |
| | apprehensive_jig | true | yes | no | 5b2bcbc9-e705-4544-89f6-387a7... |
| | arrogant_rabbit | true | yes | no | 44d7cc5b-ce6c-49aa-9cde-10e24... |
| | astonishing_dove | true | yes | yes | 1803589b-2c10-499c-ac44-e1fa5... |
| | bewildered_caterpillar | true | yes | yes | a4c482f7-44ce-4173-9bc3-234685... |
| | brave_floor | true | yes | no | 1a5c2490-5a69-4f32-aaa6-6375c... |
| | cheeky_lobster | true | yes | no | a212e536-6cb4-4d80-8911-6ea3c... |
| | combative_roadrunner | true | yes | yes | 500e0a75-3984-4a99-a9c7-0cbed... |

ACTIONABLE ALERTING AND DIAGNOSTIC SYSTEM FOR WATER METERING SYSTEMS

RELATED APPLICATIONS

This application is a continuation-in-part of U.S. application Ser. No. 17/393,617 filed on Aug. 4, 2021, entirety of which is incorporated herein by reference.

FIELD

The present disclosure relates to an actionable alerting and diagnostic system for water metering systems.

BACKGROUND

The metrics of water metering systems like efficiency, capacity, system health, water flow, leak detection and appliance operations are traditionally assessed in laboratory conditions or with precise instrumentation. In a real world setting many latent variables are introduced-noisy inconsistent power, sensor placement, weather, device damage and failure. There exists a need for an actionable alerting and diagnostic system that can yield reasonable results for a critical mass of the joint probability space over these latent variables.

BRIEF DESCRIPTION OF DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

SUMMARY

A computer-implemented method is disclosed. The method can include receiving data from a water metering device regarding a potential issue in the water metering device; curating the data with a machine learning model; receiving ground truth data associated with the curated data from a user of the water metering device; comparing the curated data with the ground truth data; and optimizing the machine learning model based on the comparing.

In various example embodiments, the machine learning model can be based on gradient boosted trees, probabilistic neural networks, and/or an autoregressive kernel density estimator. The data received from the water metering device can be triggered based on pre-defined settings of the water metering device. The ground truth data may include empirical information based on direct observation and measurement. The user of the water metering device can be a professional (e.g., technician, installer) or customer who operates the water metering device. The method may include tracking the data received from the water metering device to troubleshoot the potential issue. The method may include storing metrics associated with the optimizing of the machine learning model. The method may include changing rules implemented in the machine learning model and/or changing training data of the machine learning model for optimizing the machine learning model.

A system is also disclosed. The system may comprise a processor and associated memory. The processor can be configured to: receive data from an water metering device regarding a potential issue in the water metering device; curate the data with a machine learning model; receive ground truth data associated with the curated data from a user of the water metering device; compare the curated data with the ground truth data; and optimize the machine learning model based on the comparison.

DESCRIPTION

The present disclosure provides an actionable alerting and diagnostic system for water metering systems. Such a system provides techniques for different agents (e.g. contractors, hardware engineers, software engineers, customers, etc.) associated with the water metering systems to communicate with each other and as a result improve their performance. The disclosed system yield results for a critical mass of a joint probability space with many latent variables. It can be based on a hierarchy of models that combines human in the loop (HITL) machine learning algorithms with rules-based analytics. Subsequent disclosure provides a detailed description of such techniques.

Figure 1:
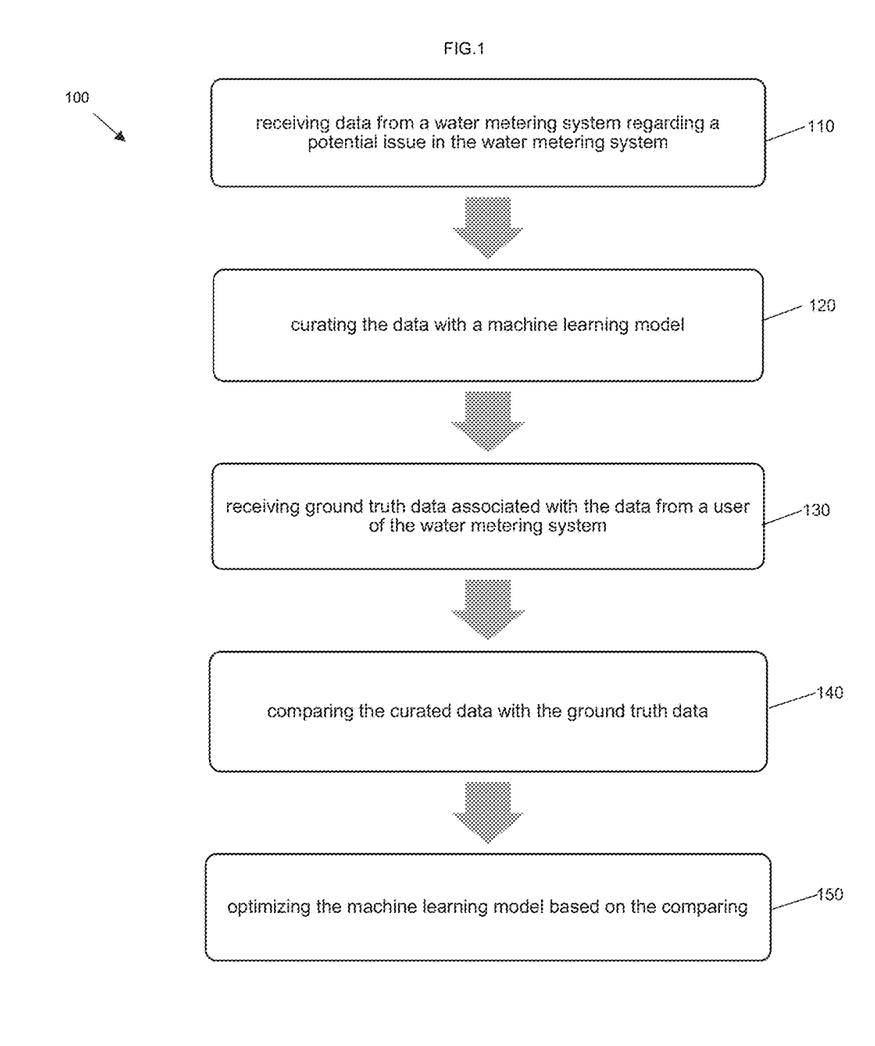
FIG. 1 shows a flowchart of a method according to an example embodiment of the present disclosure.

FIG. 1 illustrates a flowchart of a computer-implemented method 100 of providing explainable diagnostics for a water metering system according to an example embodiment of the present disclosure. The method 100 can include a step 110 of receiving data from a water metering system. The data can originate from various components of the water metering system and can be transmitted to the computing device (e.g., a processor) performing step 110. In an example embodiment, the data can be collected using sensors (e.g., magnetic sensors) on or proximate the water metering system that may be processed before being sent and received at step 110, an example of which is disclosed in U.S. Pat. No. 10,965,488, which is incorporated herein by reference in its entirety.

The data can provide information regarding potential issues associated with the components of the water metering system. For example, the data can provide information that the water metering system has issues related to water flow, leak detection, appliance operations in a premises, etc.

In an example embodiment, the potential issues can be triggered based on pre-defined settings of the water metering system. For example, the settings can be based on a nominal flow rate and/or bypass size range (e.g., nominal flow rate between 1 liter/sec and 10 liter/sec, bypass size between 25 mm and 50 mm). If the nominal flow rate and/or bypass size crosses the threshold defined by the settings, an alert can be triggered indicating that one or more components of the water metering system may be malfunctioning.

The data can be transmitted using a wired, optical, and/or wireless electromagnetic transmission medium, etc. In example embodiments, the data can be transmitted immediately after they are triggered or transmitted periodically (e.g., collating the data, storing in a database, and transmitting after a pre-defined time interval).

The method 100 can include a step 120 of curating the data with a machine learning model, which can be based on one or more algorithms such as gradient boosted trees, probabilistic neural networks, autoregressive kernel density estimator (KDE), etc.

When a potential issue is triggered, it may trigger related issues. For example, if an issue is triggered regarding leakage, other potential issues such as low water pressure, sudden surges of water pressure, air in the water pipes, or a problem with a valve in the plumbing fixtures may be triggered. These issues may be detected by the models/rules disclosed herein. The machine learning model may curate the data received for the related issues.

In an example embodiment, the curating may include combining some of the related issues as one issue if, for example, the underlying cause of such issues is the same. For example, if there is a problem with a valve in the plumbing fixtures, it may generate various potential issues indicating low water pressure, sudden surges of water pressure, and/or air in the water pipes. Because the cause of these related issues is the same—a faulty valve—the issues may be combined into a single "faulty valve" data.

In an example embodiment, the preliminary training of the machine learning model can be based on the historical responses of users (e.g., customers and professionals) and/or telemetry data associated with the water metering system. For example, if historical responses of users that were alerted about low water pressure due to a faulty valve have been to suppress the issue as false positive, then the machine learning model can be configured to exclude such an issue from the curated data.

As used herein, a user of the water metering system can be a hardware professional (e.g., an engineer) trained on the hardware aspects of the water metering system or an installation professional (e.g., a contractor) trained on the installation aspects of the water metering system. Of course, other professionals trained in various aspects of the water metering system can also be users. A customer (e.g., household/commercial customer) can also be a user of the water metering system.

The method 100 can include a step 130 of receiving ground truth data associated with the curated data from a user of the water metering system. The ground truth data can be empirical information that is provided by the user via direct observation and measurement (e.g., visual leak inspection, isolation method to discover leaks in the system, flow indicator, volume indicator, undercharged system, etc.) by the professionals and/or customers.

The curated data, as previously described in step 120, can be transmitted from the water metering system to a user's device (e.g., phone, tablet, laptop, etc.). In an example embodiment, after the users receive the data, they can act to directly observe potential issues in the water metering system indicated by the curated data.

Thereafter, the users may categorize the potential issues as a critical issue, urgent action required, potential problem, unsure, ignore issue, false alarm, etc. This categorization can be based on their prior experience and/or knowledge about the same or similar issues. This categorization and associated empirical information about the potential issue/alert can be transmitted, as ground truth data, to the computing device performing the method 100. The alert can also be tracked using an application to track troubleshooting interactions with the customer. Metrics surrounding the interactions can be used to inform future user guidance.

The method 100 can include a step 140 of comparing the curated data with the ground truth data for those issues. Comparing can involve determining whether the information regarding the potential issues in the curated list generated in step 120 is comparable to the ground truth data for those issues received in step 130. If it is comparable, the alert can be considered a True Positive (TP). If a potential issue is present in the curated data but labeled as false positive/false alert in the ground truth data, such an issue can be considered a False Positive (FP). In some cases, the ground truth data may identify a potential issue that was not captured in the curated data. In such a scenario, the potential issue can be considered a False Negative (FN).

The method 100 can include a step 150 of optimizing the machine learning model based on the comparison in step 140. Optimizing may include affirming the rules of the machine learning model when an accurate result (e.g., a TP) is generated in the comparing step 140. The optimizing may include changing aspects of the machine learning model when an incorrect result (e.g., a FP or FN) is generated in the comparing step 140. This may include changing the rules implemented in the machine learning model. In addition, or alternately, this may include changing training data on which the machine learning model is trained.

For example, for the "faulty valve" alert example previously described with respect to step 120, if the machine learning model provides a FN result with respect to the sudden surges of water pressure issue, the rules may be changed so that the sudden surges of water pressure is not combined into the single faulty valve issue, rather it is maintained as its own issue.

In an example embodiment, experts of the water metering system, based on their observations regarding the efficacy of diagnostic models for water metering system performance, may propose further changes to the water metering system's firmware or to the machine learning models that curated the examples.

In an example embodiment, one or more steps in the method 100 can be performed using a web or smartphone application. The application may define several user roles with each user of the application being assigned one or more roles. Creation of user accounts and assignment of roles can be controlled by the application administrator(s). In an example embodiment, one or more steps in the method may be fully automated, without requiring any direct human user input. In example embodiments, one or more steps of the method 100 can be implemented on a cloud-based server and/or a local server application. In an example embodiment, the method 100 can be implemented on an electromechanical device.

Figure 2:
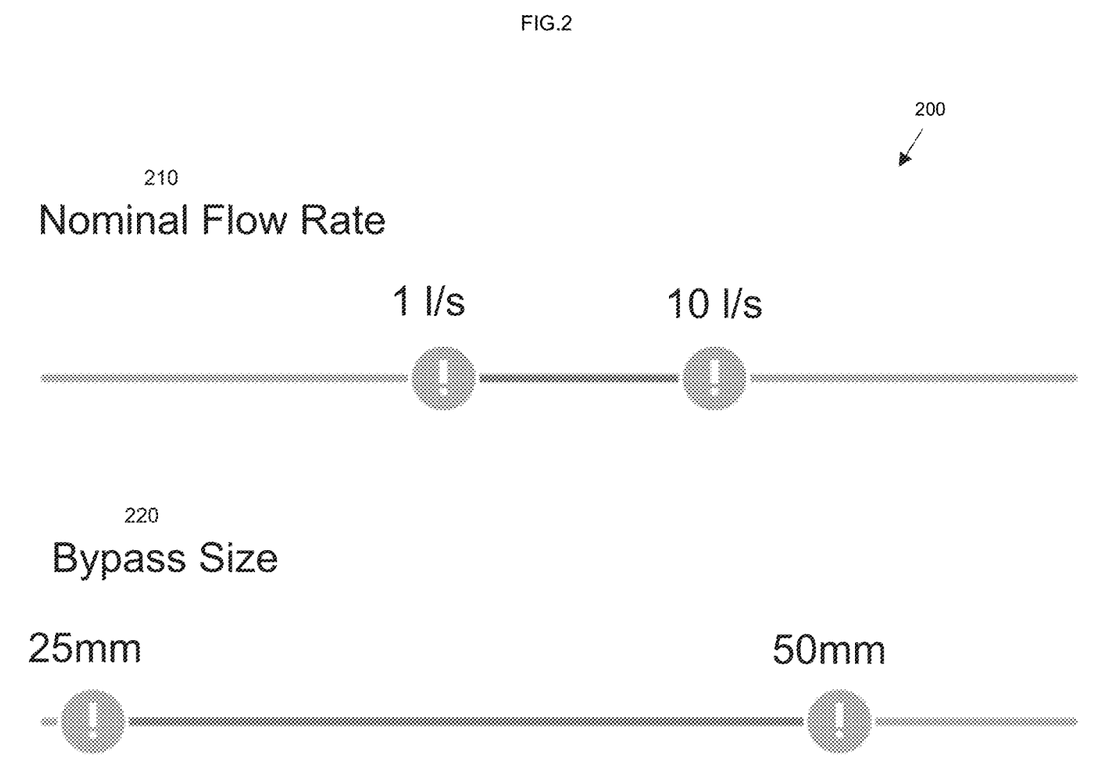
FIG. 2 illustrates a user interface according to an example embodiment of the present disclosure.

FIG. 2 shows an example user interface 200 to display and or configure pre-defined settings of a water metering system for triggering alerts, as previously described with respect to step 110. The user interface 200 can be presented on various user devices such as tablets, smartphones, laptops, etc. Users of the system (e.g., engineers, contractors, customers, etc.) can select thresholds at the user interface for various components. For example, in the illustrated example, the nominal flow rate component would trigger an alert when the nominal flow rate 210 is below 1 liter/sec or above 10 liter/sec. In the illustrated example, the bypass size component would trigger an alert when the bypass size 220 is below 25 mm or above 50 mm. In one or more embodiments, the upper and lower boundaries (denoted by the ! symbol) may be selected and changed by the user using a click and drag operation (i.e., sliding the boundaries to the left or right).

Figure 3:
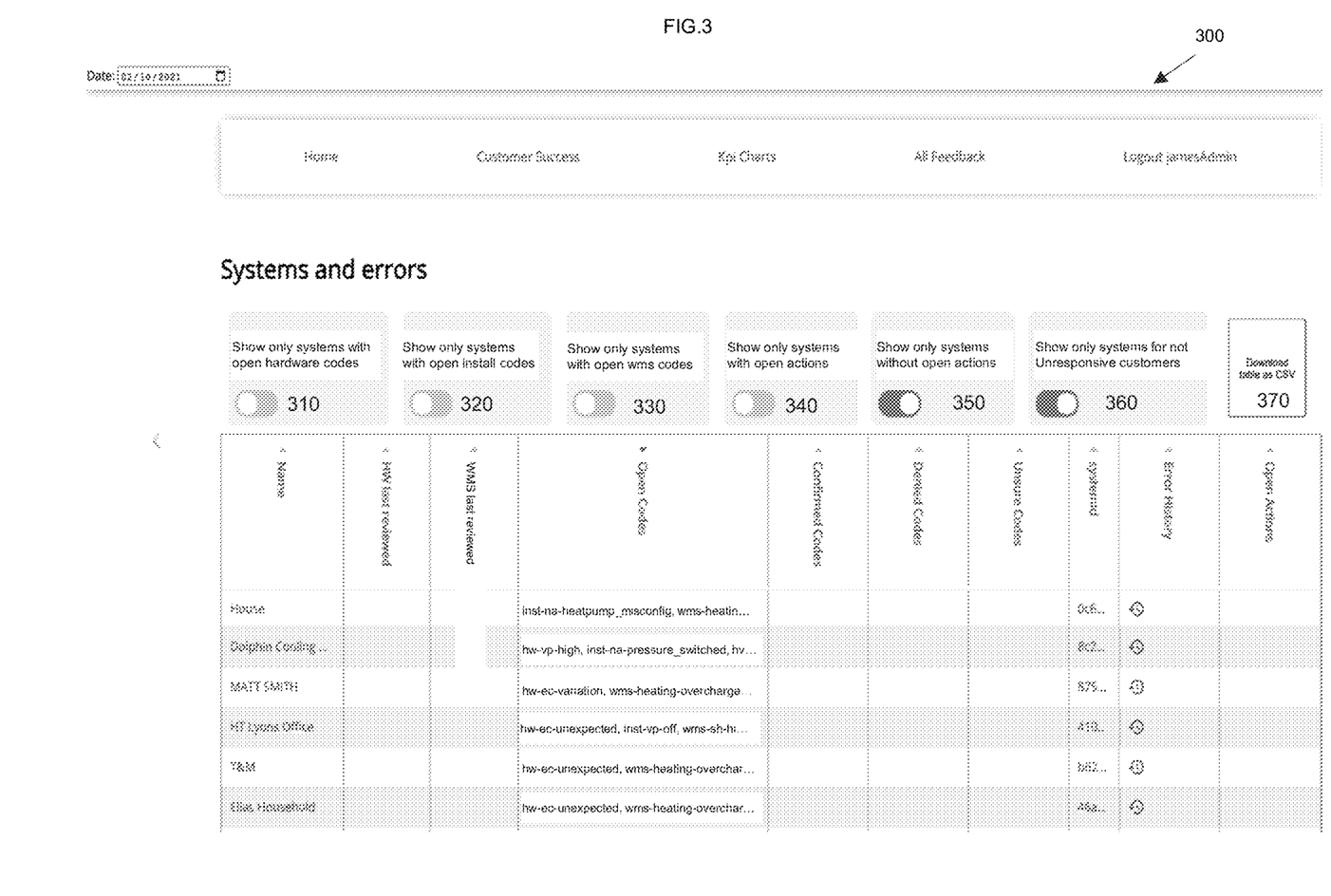
FIG. 3 illustrates a user interface according to an example embodiment of the present disclosure.

FIG. 3 illustrates an example systems and errors user interface 300 accessible by trained professionals (e.g., engineers) of the water metering device. The professionals can use the user interface 300 to search issues based on system, rule, model, or customer status. This can help track alerts/issues (as previously described with respect to step 130) and troubleshoot interactions with the customers of the water metering system.

The user interface 300 may contain various software toggle buttons to facilitate the searching of issues based on system, rule, model, or customer status. For example, button 310 can be toggled to show water metering system (wms) with hardware issues. Button 320 can be toggled to show systems with installation issues. Button 330 can be toggled to show systems with open wms codes. Button 340 can be toggled to show systems with open issues. Button 350 can be toggled to show systems without open issues. Button 360 can be toggled to show systems of responsive customers.

In the illustrated example, only buttons 350 and 360 are in the toggled-on position (i.e., toggled so that the information associated with the buttons is shown) while buttons 310, 320, 330 and 340 are in the toggled off position (i.e., toggled so that the information associated with the buttons is not shown). In an example embodiment, information regarding the issues can also be downloaded into memory by using the button 370.

Figure 4:
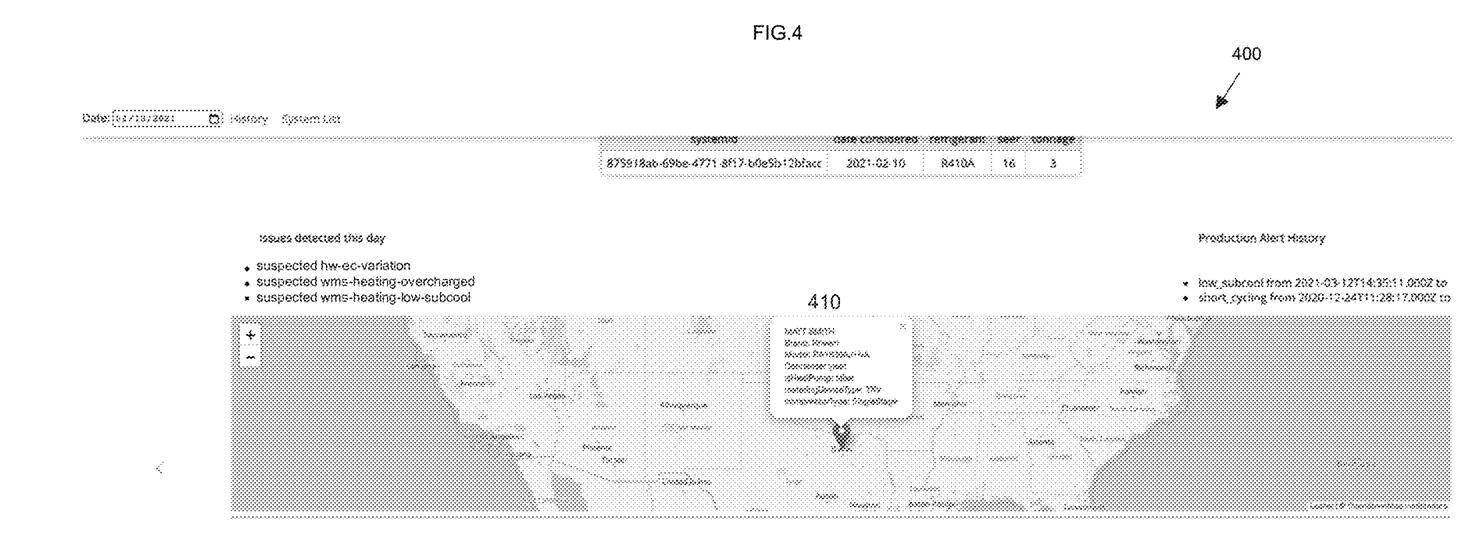
FIG. 4 illustrates a user interface according to an example embodiment of the present disclosure.

FIG. 4 shows an example telemetry user interface 400 used for reviewing detailed information regarding a water metering device. For example, portion 410 shows the geographical location of the device. Other telemetry data can also be viewed using the user interface 400. In an example embodiment, the telemetry user interface 400 may be linked to the systems and errors user interface 300. A user can navigate from interface 300 to interface 400 by selecting the system identifier (e.g., "systemid") displayed on interface 300. In one or more embodiments, the users can drill down to look at particular system's telemetry readings for a particular day. They can see all historical alerts sent to the users, and what rules/models they suspect may be wrong based on the past twenty-four hours of telemetry.

Figure 5:
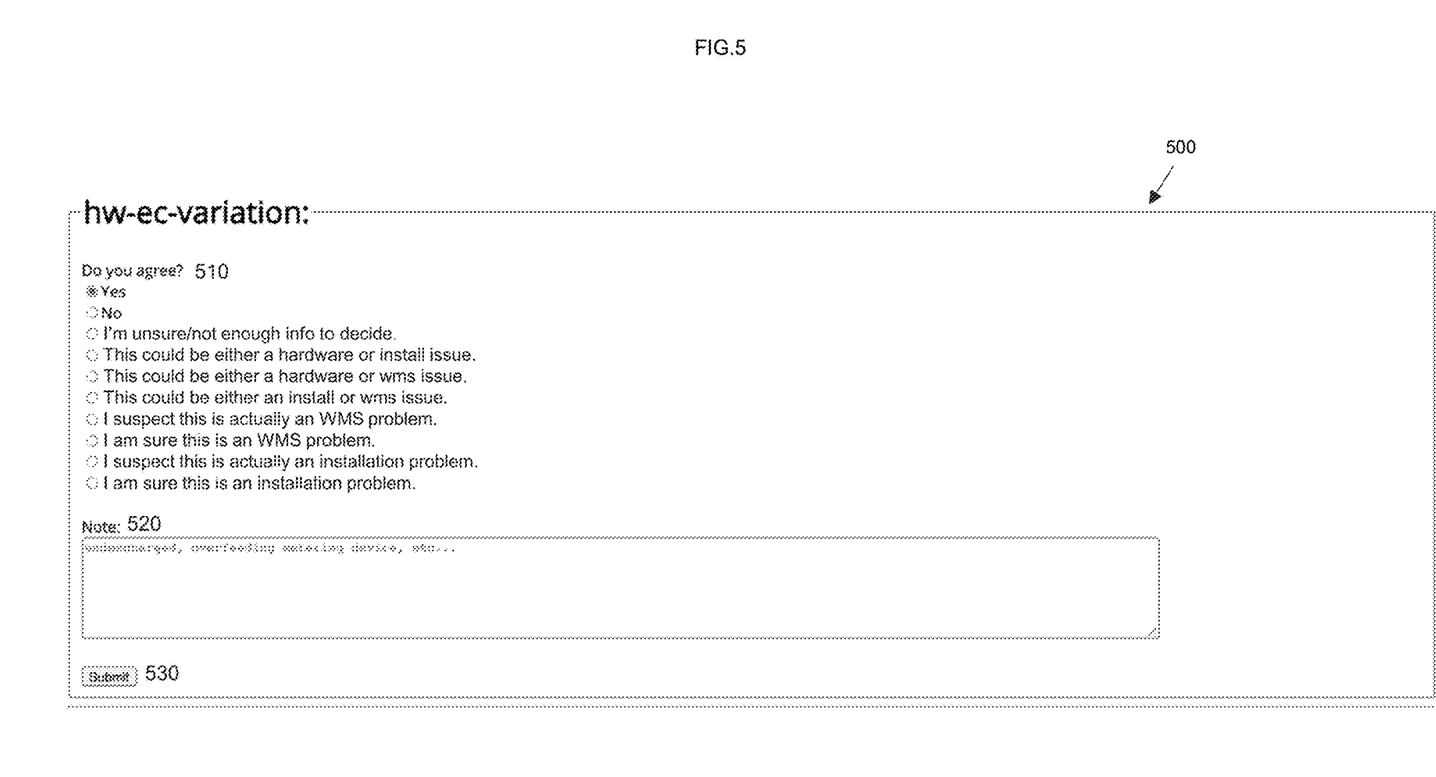
FIG. 5 illustrates a user interface according to an example embodiment of the present disclosure.

FIG. 5 shows an example review user interface 500 that can be used to provide ground truth data as previously described in step 130. In an example embodiment, the review user interface 500 may have the following options 510 allowing users to provide their feedback on a particular issue and its analysis/detection by the machine learning model: agree or disagree with the output of the machine learning model; not enough information to decide; could be a hardware or wms issue, could be an installation or wms issue, likely that it's a wms issue; certain that it's a wms issue; likely that it's an installation issue; certain that it's an installation issue. Further, the review user interface 500 may provide a notes section 520 to enter free text if the issue doesn't fit in the pre-set criterion and/or if the trained professional wants to elaborate on the issue. The user can submit the feedback by selecting the "submit" button 530.

In an example embodiment, the interface can have a selection button allowing the user to request review by an expert or professional (e.g., hardware expert, installation expert, etc.) if there is not enough information to decide on an issue and/or if the user seeks an expert opinion. A list of such cases can be enqueued for the expert professional. Depending on the users' assigned roles, they may be asked to review a rule or model's diagnosis. Depending on the type of rule/model, this feedback may be sent to the engineering team for rule modification, or to an online process for updating a machine learning model.

Figure 6:
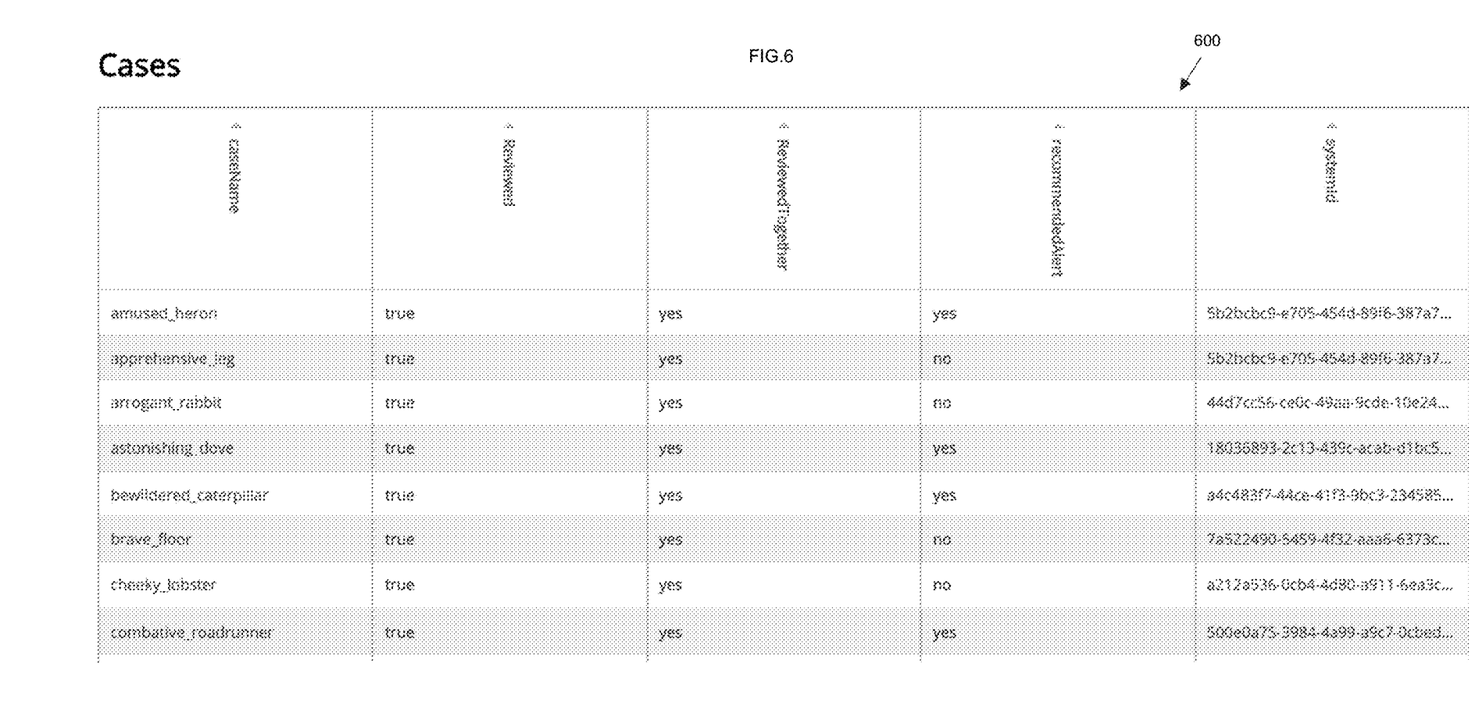
FIG. 6 illustrates a user interface according to an example embodiment of the present disclosure.

FIG. 6 shows an example user interface 600 illustrating enqueued cases that are to be reviewed by an expert or professional. The expert or professional may go over the cases with a committee of other reviewers to ensure a quality and balanced review process. Based on the feedback collected from the expert or professional, engineer/product managers may evaluate each rule or model's performance, rework the hierarchy, and update the configuration of production alerts.

Figure 7:
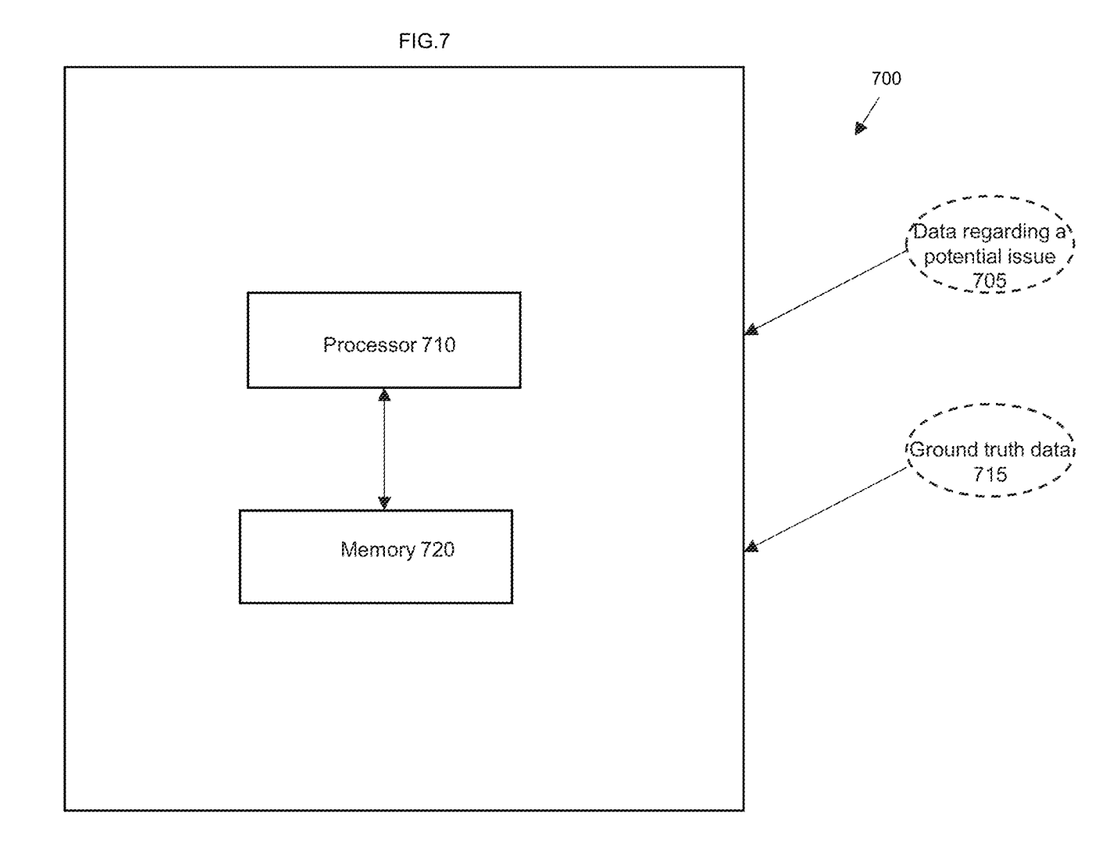
FIG. 7 shows a system according to an example embodiment of the present disclosure.

FIG. 7 shows an example system 700 for providing explainable diagnostics for a water metering device. The system 700 may include a processor 710 and an associated memory 720. The processor 710 may be configured to receive data 705 from a water metering device regarding a potential issue in the water metering device. This aspect is similar to step 110 of method 100.

The processor 710 may be configured to curate the data with a machine learning model. This aspect is similar to the step 120 of method 100. The machine learning model (not shown) can be based within the device or be based external to the device. The processor 710 may be configured to receive ground truth data 715 associated with the curated data from a user of the water metering device. This aspect is similar to step 130 of method 100.

The processor 710 may be configured to compare the curated data with the ground truth data. This aspect is similar to step 140 of method 100. The processor 710 may be configured to optimize the machine learning model based on the comparison. This aspect is similar to step 150 of method 100.

In an example embodiment, the system 700 can be implemented using a web or smartphone application. The application may define several user roles with each user of the application being assigned one or more roles. Creation of user accounts and assignment of roles can be controlled by the application administrator(s). In example embodiments, the system 700 can be implemented on a cloud-based server and/or a local server application. In an example embodiment, the system 700 can be implemented on a water metering device.

In an example embodiment, the method 100 and/or system 700 can be used to educate students regarding identification and rectification of potential issues in a water metering device. Students can be provided the data generated by the water metering device (step 110) and asked to review and curate the alerts. This can be compared with the curating performed by the machine learning model (step 120), which can then be used to provide valuable real-world information/education to the students. The user interface for educated students regarding identification and rectification of potential issues in a water metering device can be similar to the user interface shown in FIG. 8 of U.S. application Ser. No. 17/393,617.

Figure 8:
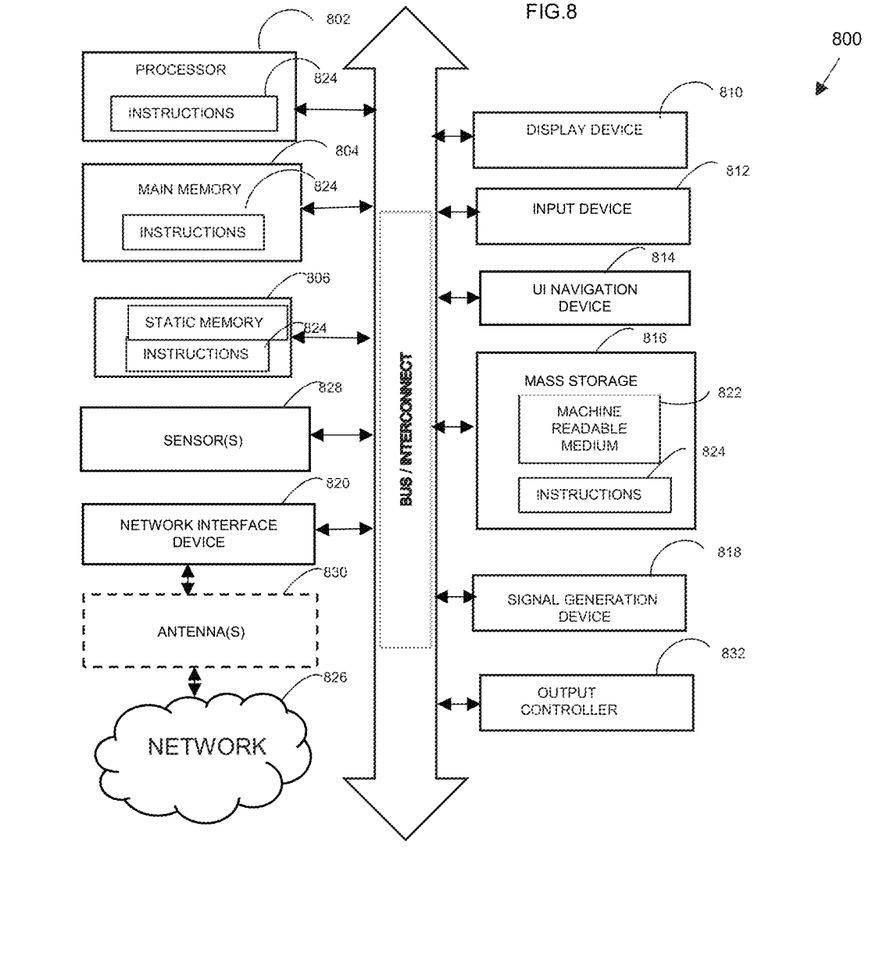
FIG. 8 illustrates a machine configured to perform computing operations according to an embodiment of the present disclosure.

FIG. 8 is a block diagram illustrating an example computer system 800 upon which any one or more of the methodologies (method 100 and/or device 700) may be run according to an example described herein. Computer system 800 may be embodied as a computing device, providing operations of the components featured in the various figures, including components of the device 700, method 100, or any other processing or computing platform or component described or referred to herein.

Example computer system 800 includes a processor 802 (e.g., a central processing unit (CPU), a graphics processing unit (GPU) or both), a main memory 804 and a static memory 806, which communicate with each other via an interconnect. The computer system 800 may further include a video display unit 810, an input device 812 (e.g., keyboard) and a user interface (UI) navigation device 814 (e.g., a mouse). In one embodiment, the video display unit 810, input device 812 and UI navigation device 814 are part of a touch screen display. The computer system 800 may additionally include a mass storage device 816 (e.g., a hard drive unit), a signal generation device 818 (e.g., a speaker), an output controller 832, and a network interface device 820 (which may include or operably communicate with one or more antennas 830, transceivers, or other wireless communications hardware), and one or more sensors 828.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 constituting machine-readable media.

While the machine-readable medium 822 (also known as a computer-readable medium) is illustrated in an example embodiment to be a single medium, the term "machine-readable medium" may include a single medium or multiple medium (e.g., a centralized or distributed database, and/or associated caches and servers) that store the one or more instructions 824.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, optical media, magnetic media or other non-transitory media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system 800 may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

In alternative embodiments, the computer system 800 can operate as a standalone device or may be connected (e.g., networked) to other machines. In a networked deployment, the computing system 800 may operate in the capacity of either a server or a client machine in server-client network environments, or it may act as a peer machine in peer-to-peer (or distributed) network environments.

Additional examples of the presently described method and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method, comprising:
    receiving data from a water metering system regarding a potential issue in the water metering system;
    curating the data with a machine learning model based on one or more of gradient boosted trees, probabilistic neural networks, or an autoregressive kernel density estimator, the curating combining the potential issue with a second potential issue;
    receiving ground truth data associated with the curated data from a user of the water metering system, wherein the ground truth data includes categorization information that indicates a severity of at least one of the potential issue or the second potential issue, the categorization information being based on the user's prior experience and/or knowledge about the same or similar issues;
    comparing the curated data with the ground truth data, the comparing determining whether the combination of the potential issue with the second potential issue is to be maintained; and
    optimizing the machine learning model based on the comparing.

2. The method of claim 1, further comprising:
    tracking the data received from the water metering system to troubleshoot the potential issue.

3. The method of claim 1, further comprising:
    storing metrics associated with the optimizing of the machine learning model.

4. The method of claim 1, wherein the data received from the water metering system is based on pre-defined settings of the water metering system.

5. The method of claim 1, wherein the ground truth data includes empirical information based on direct observation and measurement.

6. The method of claim 1, wherein the user of the water metering system is a professional or a customer who operates the water metering system.

7. The method of claim 1, wherein optimizing of the machine learning model comprises changing rules implemented in the machine learning model.

8. The method of claim 1, wherein optimizing of the machine learning model comprises changing training data of the machine learning model.

9. A system comprising a processor and associated memory, the processor being configured to:
    receive data from a water metering system regarding a potential issue in the water metering system;
    curate the data with a machine learning model based on one or more of gradient boosted trees, probabilistic neural networks, or an autoregressive kernel density estimator, the curating combining the potential issue with a second potential issue;
    receive ground truth data associated with the curated data from a user of the water metering system, wherein the ground truth data includes categorization information that indicates a severity of at least one of the potential issue or the second potential issue, the categorization information being based on the user's prior experience and/or knowledge about the same or similar issues;
    compare the curated data with the ground truth data, the comparing determining whether the combination of the potential issue with the second potential issue is to be maintained; and
    optimize the machine learning model based on the comparison.

10. The system of claim 9, wherein the processor is further configured to track the data received from the water metering system to troubleshoot the potential issue.

11. The system of claim 9, wherein the processor is further configured to store metrics associated with the optimization of the machine learning model.

12. The system of claim 9, wherein the data received from the water metering system is based on pre-defined settings of the water metering system.

13. The system of claim 9, wherein the ground truth data includes empirical information based on direct observation and measurement.

14. The system of claim 9, wherein the user of the water metering system is a professional or customer who operates the water metering system.

15. The system of claim 9, wherein to optimize the machine learning model, the processor is configured to change rules implemented in the machine learning model.

16. The system of claim 9, wherein to optimize of the machine learning model, the processor is configured to change training data of the machine learning model.

17. The method of claim 1, wherein the severity indicates whether the potential issue is one or more of a critical issue, urgent action required, potential problem, unsure, ignore issue, and false alarm.

18. The system of claim 9, wherein the severity indicates whether the potential issue is one or more of a critical issue, urgent action required, potential problem, unsure, ignore issue, and false alarm.

* * * * *